United States Patent Office
2,996,534
Patented Aug. 15, 1961

2,996,534
PREPARATION OF METAL TETRA-ALKOXYBORATES
George L. Cunningham, Burtonsville, and Frank Pretka, Catonsville, Md., assignors to Callery Chemical Company, Pittsburgh, Pa., a corporation of Pennsylvania
No Drawing. Filed Sept. 18, 1958, Ser. No. 761,679
7 Claims. (Cl. 260—462)

This invention relates to the preparation of tetraalkoxyborates.

The tetraalkoxyborates, $M[B(OR)_4]_n$, where M is a metal ion, $n$ is the valence of the metal ion, and R is an alkyl radical, are useful as intermediates for the preparation of a variety of boron containing compounds. They have also been used in a process for making a permanent colored coating on aluminum by Cunningham, U.S. 2,785,098. Methods of preparing one tetraalkoxyborate from another tetraalkoxyborate are of particular value since tetraalkoxyborates are available as by-products from processes which produce other boron compounds. For example, a metal tetramethoxyborate is a by-product from the process of Brown et al. to prepare metal borohydrides, J. Am. Chem. Soc. 79, 5400.

It is an object of this invention to provide a method of converting a tetraalkoxyborate to another tetraalkoxyborate having different alkyl groups.

Other objects and advantages of this invention will be apparent from the following description.

This invention is based on our discovery that an equilibrium exchange reaction occurs between a metal tetraalkoxyborate and an alcohol according to

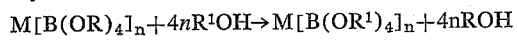

$$M[B(OR)_4]_n + 4nR^1OH \rightarrow M[B(OR^1)_4]_n + 4nROH$$

where M is a metal ion, $n$ is the valence of the metal ion, and R and $R^1$ are different alkyl radicals. In order to drive the reaction to completion, it is necessary to separate the product alcohol from the product tetraalkoxyborate. If the product alcohol, ROH, is more volatile than the reactant alcohol, $R^1OH$, the equilibrium reaction may conveniently be forced to completion by volatilizing the product alcohol from the reaction mixture. The products may be separated by other conventional methods such as fractional crystallization of the product tetraalkoxyborate.

A preferred process of this invention is accomplished by mixing the reactant alcohol and metal tetraalkoxyborate and heating the reactant mixture to volatilize the product alcohol. It is generally preferred to fractionate the alcohol vaporized from the reaction mixture to permit complete separation of the reactant and product alcohols thereby eliminating losses of reactant alcohol by volatilization. If there is a large difference in the boiling points of the reactant and product alcohols essentially complete separation can be obtained by a simple evaporation from the reaction mixture.

The product tetraalkoxyborate remains either as a dry solid, partially dissolved in reactant alcohol, or completely dissolved, depending on the amount of reactant alcohol used. If a stoichiometric amount of alcohol is used, the reaction mixture is heated and distilled to dryness leaving a dry solid product. It is preferred to use excess reactant alcohol because the distillation to dryness is a difficult unit operation and because the use of excess reactant alcohol promotes the reaction by mass action effect. The product tetraalkoxyborate can be recovered from alcohol solution by any of the conventional methods, e.g., by the evaporation of the alcohol or by crystallization of the tetraalkoxyborate.

The method is applicable to the preparation of any tetraalkoxyborate, such as tetraalkoxyborates of alkali metals and alkaline earth metals. If the reaction is forced to completion by removing product alcohol, it is necessary only that the alcohol corresponding to the alkoxy component of the reactant tetraalkoxyborate be more volatile than the reactant alcohol. Thus, a tetraalkoxyborate with higher alkoxy substituents can be prepared from a lower tetraalkoxy borate and a higher alcohol, e.g., tetrapropoxy borates are prepared from propyl alcohol and a tetraethoxyborate or a tetramethoxyborate. Similarly, isomeric tetralkoxyborates are prepared by this method, e.g., the reaction of tetra-iso-propoxyborate and n-propyl alcohol produces tetra-n-propoxyborate.

In one reaction illustrative of the invention 157.8 parts of sodium tetramethoxyborate and 1500 parts of n-butyl alcohol were placed in a flask equipped with a Vigreaux distilling column. The reactants were refluxed for about one-half hour and then distilled. Approximately 128 parts of methanol was recovered in the distillate. The solution left in the flask was evaporated to dryness under vacuum; the resulting solid residue consisted of 326 parts of sodium tetrabutoxyborate. The sodium tetrabutoxyborate product contained 3.40% boron and 7.20% sodium compared to the theoretical values of 3.50% boron and 7.50% sodium. The product was 95.43% pure, and the only major impurity was n-butyl alcohol.

Other tetraalkoxyborates were similarly prepared. For example 20 grams of sodium tetramethoxyborate and 135 grams of ethyl alcohol were charged to a reaction flask equipped with a 770 mm. Vigreaux distilling column. The reaction mixture was refluxed for one hour and a mixture of methanol and ethanol was distilled over below 79° C. The contents of the flask were then evaporated under vacuum leaving a solid product of 86% sodium tetraethoxyborate. In the same manner 80% magnesium tetraethoxyborate was prepared from magnesium tetramethoxyborate and ethanol.

According to the provisions of the patent statutes, we have explained the principle and mode of practicing our invention, have described what we now consider to be its best embodiments. However, we desired to have it understood that within the scope of the appended claims, the invention may be practiced otherwise than as specifically described.

We claim:
1. A method of producing a tetraalkoxyborate which comprises reacting a metal tetraalkoxyborate of the formula $M[B(OR)_4]_n$ with an alcohol of the formula $R^1OH$ and recovering a metal tetraalkoxyborate of the formula $M[B(OR^1)_4]_n$, where M is a metal ion selected from the group consisting of alkali metal and alkaline earth metal ions, $n$ is the valence of the said metal ion, R is an alkyl radical, and $R^1$ is an alkyl radical of higher molecular weight than R.
2. A method in accordance with claim 1 in which an alcohol of the formula ROH which is produced in the said reaction is volatilized from the reaction mixture.
3. A method according to claim 1 in which there is a substantial excess of $R^1OH$.
4. A method according to claim 1 in which R is a methyl radical.
5. A method according to claim 1 in which M is sodium.
6. A method according to claim 1 in which M is magnesium.
7. A method of preparing a sodium higher tetraalkoxyborate which comprises reacting sodium tetramethoxyborate with an alcohol containing more than one carbon atom, vaporizing methanol from the reaction mixture and recovering the tetraalkoxyborate formed.

References Cited in the file of this patent
UNITED STATES PATENTS 2,088,935 Vaughn _____ Aug. 3, 1937
2,587,753 O'Connor et al. _____ Mar. 4, 1952